F. L. TRAVIS.
SAW CLAMP.
APPLICATION FILED MAY 26, 1916.
1,216,890.
Patented Feb. 20, 1917.
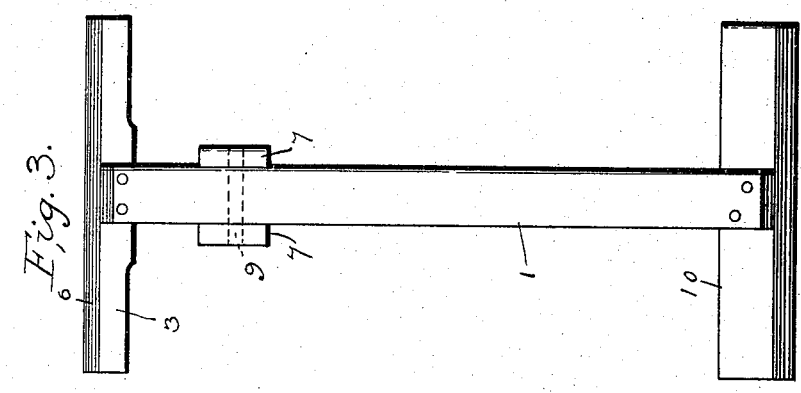
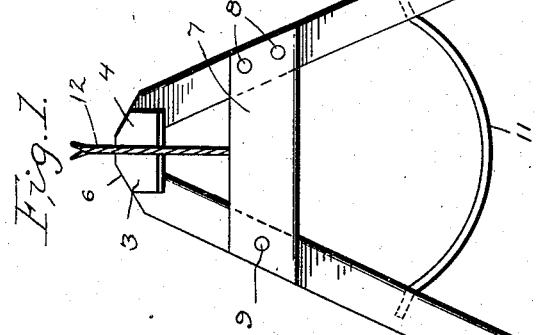
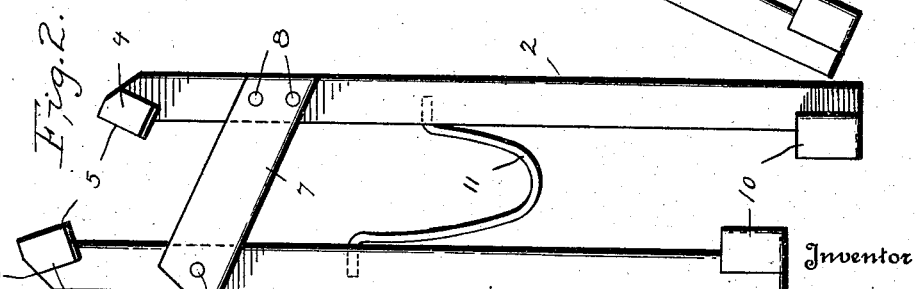
Witnesses
Inventor
F. L. Travis
By
Attorney

UNITED STATES PATENT OFFICE.

FRANK L. TRAVIS, OF BRIGHTON, MICHIGAN.

SAW-CLAMP.

1,216,890.  Specification of Letters Patent.  Patented Feb. 20, 1917.

Application filed May 26, 1916. Serial No. 100,145.

*To all whom it may concern:*

Be it known that I, FRANK L. TRAVIS, a citizen of the United States, residing at Brighton, in the county of Livingston and State of Michigan, have invented certain new and useful Improvements in Saw-Clamps; and I do hereby declare the following to be a full, clear, and exact description of the invention, such as will enable others skilled in the art to which it appertains to make and use the same.

This invention relates to new and useful improvements in a saw clamp and one of its objects is the provision of a device of this character, which shall be simple, durable and efficient, and which may be manufactured and sold at a comparatively low cost.

Another object of this invention is to provide a pair of standards, having clamping members or jaws secured to their upper ends and adapted to be brought into an engagement with each other to clamp and support a saw blade, whereby the teeth thereof may be readily filed and sharpened.

A further object of this invention is to provide upwardly inclined connecting members secured to one of the standards adjacent its upper end and pivoted to the other standard, whereby the lower ends of the standards may be moved apart to support the standards and bring the clamping members together to clamp a saw blade.

A still further object of this invention is to provide a leaf spring detachably secured to each of the standards for normally urging the lower ends of the standards apart for clamping and supporting the saw blade and which may be removed when desired to fold the device into a compact article.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1 is a front elevation of a saw clamp, constructed in accordance with my invention, Fig. 2 is a similar view, illustrating the clamping members or jaws moved apart to receive a saw blade, and Fig. 3 is an end view of the same.

Referring in detail to the drawing, the numerals 1 and 2 indicate a pair of standards of substantially the same length, having their inner upper ends recessed to form shoulders to receive clamping members 3 and 4, which are secured within the recesses by bolts or other suitable securing means. The clamping members 3 and 4 are of such formation that they present clamping faces 5 and each is provided with its upper face inclined upwardly and inwardly as illustrated at 6.

A pair of connecting members 7 are secured to the standard 2 adjacent its upper end by means of bolts 8 and are pivotally connected to the standard 1 adjacent its upper end by means of a bolt 9, forming pivotal connection between the standards 1 and 2, whereby they may be moved toward and from each other. The lower ends of the standards are provided with cut away portions upon the inner faces to receive members 10, forming a base to each of the standards. The standards 1 and 2 are provided with recesses to receive the ends of a leaf spring 11 for urging the lower ends of the standards 1 and 2 apart, which brings the clamping members 3 and 4 into an engagement with each other for clamping a saw blade 12.

In operation, when it is desired to clamp a saw blade, the lower end of the standard 1 is moved in the direction of the lower end of the standard 2 against the tension of the spring 11, which will move the base of the standard 1 away from an engagement with the ground and move the clamping members 3 and 4 apart to receive a saw blade as clearly illustrated in Fig. 2. Upon releasing the standard 1, the spring 11 forces the lower end of the standards apart, bringing the clamping members 3 and 4 into an engagement with each other and efficiently holding and supporting the saw blade. The ends of the spring 11 may be readily removed from the recesses of the standards, whereby the lower end of the standard 1 may be brought into an engagement with the standard 2 to form a compact article which may be readily stored away in a considerably small space.

While I have shown and described the preferred embodiment of my invention, it will be understood that minor changes in construction, combination and arrangement of parts may be made without departing from the spirit and scope of the invention as claimed.

Having thus described my invention, what I claim is:—

A saw clamp comprising a pair of standards, clamping members secured to the upper ends of said standards, a pair of upwardly inclined connecting members secured to one of the standards and pivoted to the other standard to support one standard with one end above the corresponding end of the other standard when said standards extend parallel with each other for moving the clamping members apart, and a curved spring connected to the standards for moving the clamping members together to clamp a saw blade and simultaneously moving the connecting members into a horizontal plane.

In testimony whereof I affix my signature in presence of two witnesses.

FRANK L. TRAVIS.

Witnesses:
 LOUIS E. HOWLETT,
 LILLIAN LAMBKIN.

Copies of this patent may be obtained for five cents each, by addressing the "Commissioner of Patents, Washington, D. C."